United States Patent [19]

Woochan

[11] Patent Number: 5,130,190
[45] Date of Patent: Jul. 14, 1992

[54] PROCESS FOR TREATING THE SURFACE OF A FLUORESCENT MATERIAL

[75] Inventor: Kim Woochan, Kyunggi, Rep. of Korea

[73] Assignee: Samsung Electron Devices Co., Ltd., Kyunggi, Rep. of Korea

[21] Appl. No.: 631,441

[22] Filed: Dec. 21, 1990

[30] Foreign Application Priority Data

Jul. 27, 1990 [KR] Rep. of Korea ............... 90-11420

[51] Int. Cl.$^5$ ............... B32B 5/16; B05D 5/06
[52] U.S. Cl. ................... 428/331; 427/64; 427/68; 427/71; 427/73; 428/446
[58] Field of Search ............ 427/64, 68, 71, 73; 428/331, 446

[56] References Cited

U.S. PATENT DOCUMENTS 3,887,753 6/1975 Ninagawa et al. ............... 428/328

FOREIGN PATENT DOCUMENTS 57-8266 1/1982 Japan .
1-95172 4/1989 Japan .

*Primary Examiner*—Shrive Beck
*Assistant Examiner*—Roy V. King
*Attorney, Agent, or Firm*—Christie, Parker & Hale

[57] ABSTRACT

There is provided a process for treating the surface of a fluorescent material comprising the steps of adding a suitable amount of water glass ($K_2O.SiO_2$) to a dispersion of a fluorescent material, the mixture of the dispersion and water glass being stirred, adding silica particulates to the mixture, and finally adding a suitable amount of metal salt to the mixture containing the silica particulates, whereby the silica particulates adhere to the surface of the fluorescent material.

6 Claims, 1 Drawing Sheet

PROCESS FOR TREATING THE SURFACE OF A FLUORESCENT MATERIAL

BACKGROUND OF THE INVENTION

The present invention concerns a fluorescent film formed on the panel of the cathode ray tube of a color television receiver, and more particularly a process for treating the surface of a fluorescent material forming the fluorescent film.

Generally, the fluorescent film comprises a plurality of stripes or dots, which are formed by applying a mixture of a fluorescent material and a slurry of polyvinyl alcohol (PVA) and ammonium dichromate (ADC) to the panel, which is then dried, exposed to light and washed.

In this case, the stripes or dots should strongly adhere to the panel, avoid color mixing, and form a uniform and dense fluorescent film, which significantly depends on the surface treatment of the fluorescent material deposited on the panel.

Conventionally, a process for treating the surface of the fluorescent material comprises the steps of adding water glass ($K_2O \cdot SiO_2$) to a dispersion of fluorescent material, and then further adding salt such as zinc, aluminium, barium, etc. thereto, so as to precipitate a colloidal phase of a metal silicate adhering to the surface of the fluorescent material.

Although such a conventional process produces clearly formed stripes or dots of fluorescent material without color mixing, there occurs a problem that the adhering force of the fluorescent material to the panel of a cathode ray tube is weak, and the obtained fluorescent film is not dense.

Moreover, the fluorescent film deposited on the panel of the cathode ray tube of a color television receiver comprises three kinds of fluorescent material respectively coloring red, blue and green. Hence, if the adhering force of the fluorescent material to the panel is weak, the stripes or dots tend to separate from the panel, thus deteriorating the quality of the cathode ray tube.

SUMMARY OF THE INVENTION

It is an object of the present invention to obviate the drawbacks of the conventional fluorescent film deposited on the panel of a cathode ray tube.

It is another object of the present invention to provide a process for treating the surface of a fluorescent material without using an additional organic adhesive, whereby the adhering force of the fluorescent material to the panel is increased so as to form a clear, uniform and dense fluorescent film without color mixing.

According to the present invention, there is provided a process for treating the surface of a fluorescent material comprising the steps of adding a suitable amount of water glass ($K_2O \cdot SiO_2$) to a dispersion of a fluorescent material, the mixture of the dispersion and water glass being stirred, adding silica particulates to the mixture, and finally adding a suitable amount of metal salt of such as zinc, aluminium barium, etc. to the mixture containing the silica particulates, whereby the silica particulates adhere to the surface of the fluorescent material.

Preferably, the added amount of the silica particulates is 0.3–5% by weight per the added amount of the fluorescent material.

For less than 0.3% by weight of the added amount of the silica particulates, a sufficient adhesive force is not obtained. Further, for greater than 5% by weight of the added amount of the silica particulates, the adhesive force is not only reduced, but also the luminance of the fluorescent material is reduced due to the silica absorbing electron rays.

As shown in the attached drawing, the adhesive force is increased in proportion to the added amount of the silica particulates to the maximum at about 3% by weight thereof, and thereafter rather reduced to the limit at about 5% by weight thereof.

More preferably, the added amount of the silica particulates is 0.5–3% by weight.

The size of the silica particulates is preferably 0.06–0.3 $\mu$m. If it is greater than 0.3 $\mu$m, there occur color residual phenomena, while if it is less than 0.06 $\mu$m, the width of the stripes is increased.

DETAILED DESCRIPTION OF THE PREFERRED EMBODIMENT

Figure 1:
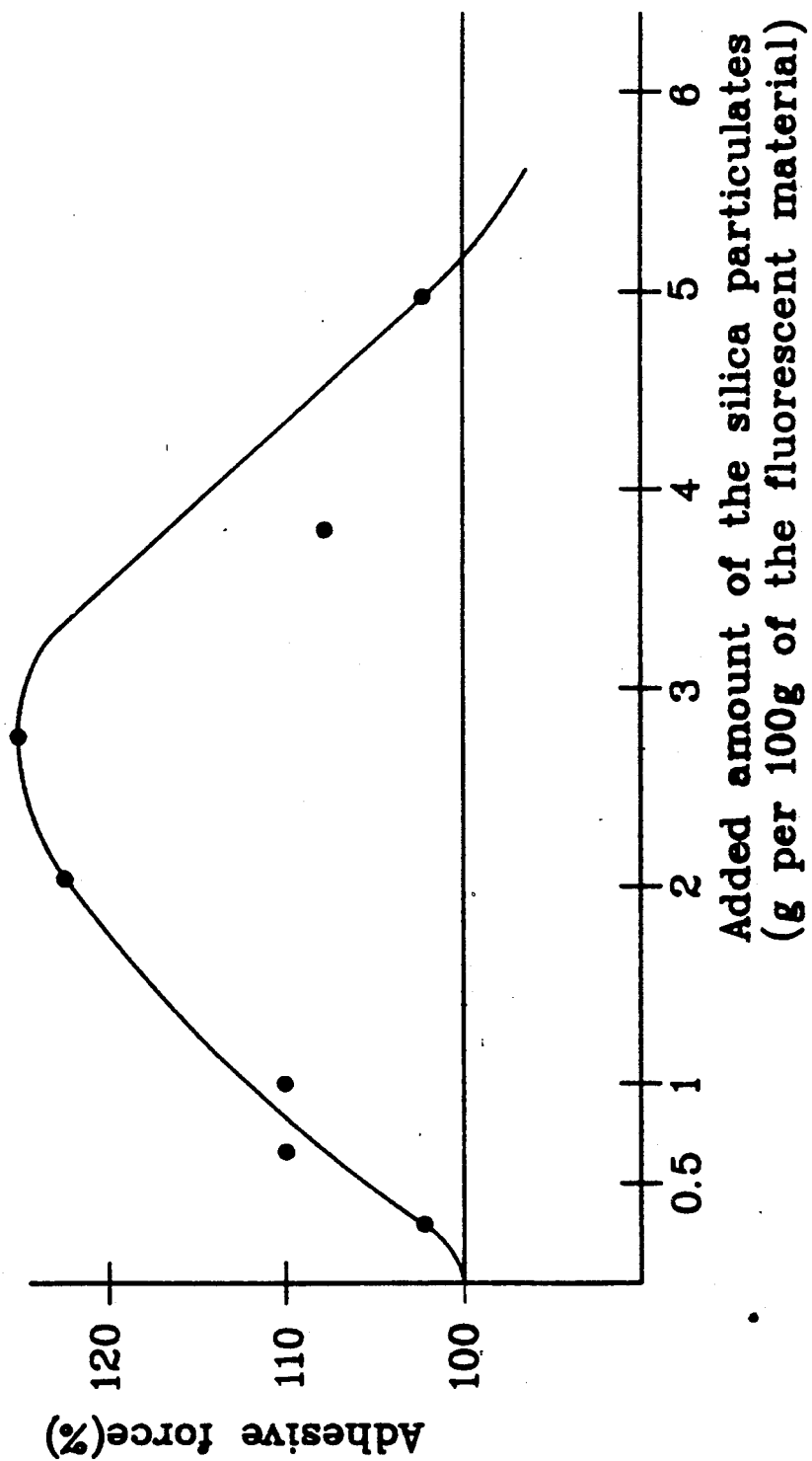
FIG. 1 is a graph for illustrating the relationship between the adhesive force of fluorescent material and the added amount of silica particulates.

First, a fluorescent material is completely dispersed in pure water by using an apparatus such as agitator, to which is in turn added a given amount of water glass (water glass containing $K_2O \cdot SiO_2$ by 18%), and the mixture is stirred for a long time to form a dispersion of the fluorescent material.

In addition, a suitable amount of silica particulates is put into a ball mill together with a small amount of water glass, and the mixture is milled for 24 hours under wet condition to obtain a complete dispersion of the silica particulates.

A mixture of the dispersion of the fluorescent material and the dispersion of the silica particulates is sufficiently stirred, and thereafter added with a given amount of a salt such as 2% zinc solution (2% zinc solution is obtained by adding an adequate amount of zinc into the solution of zinc sulfate), so that zinc silicate due to the water glass is precipitated to adhere to the surface of the fluorescent material together with the silica particulates.

In order to stabilize the mixture, an alkali solution such as ammonia water, sodium hydroxide, etc. is added so as to adjust the pH of the mixture to be 7–8.

The fluorescent material thus treated is filtered, dried for 24 hours at a temperature of 100°–120° C., and then passed through a 250 mesh screen to separate the inventive fluorescent material.

EXAMPLE 1

300 g of a green fluorescent material (ZnS: Cu, Au, Al) was put into 1 l of pure water, which was sufficiently stirred to form a dispersion. 3 ml of water glass (water glass containing $K_2O \cdot SiO_2$ by 18%) was added to the dispersion, which was stirred.

In addition, 1.5 g of the silica particulates was put into a ball mill together with a suitable amount of pure water and 0.5 ml of water glass, and the mixture was milled for 24 hours to obtain a dispersion of silica particulates.

A mixture of the dispersion of the fluorescent material and the dispersion of the silica particulates was stirred for 1 hour, and thereafter added with 10 ml of 2% zinc solution (made of zinc sulfate). Then, a suitable amount of ammonia water was added to the mixture, thus adjusting the pH thereof to 7.

The dispersion of fluorescent material thus obtained was filtered, dried for 24 hours at a temperature of 100°-120° C., and then passed through a 250 mesh screen to separate the inventive fluorescent material.

EXAMPLE 2

Substantially the same process as EXAMPLE 1 was taken to obtain the fluorescent material but with the added amount of the silica particulates being 3 g.

EXAMPLE 3

Substantially the same process as EXAMPLE 1 was taken to obtain the fluorescent material but with the added amount of the silica particulates being 6 g.

The adhesive forces of the fluorescent materials thus obtained in EXAMPLES 1-3 were tested using the following method:

The fluorescent material was mixed with a suitable amount of slurry of PVA-ADC, which was applied to the panel of a cathode ray tube and dried. The panel coated with the fluorescent material was exposed to a light through a light filter that passes gradually varied amount of light, and washed. Then, there were distributed over the panel the portions in which the fluorescent material strongly adhered to the panel through being completely exposed to the light and the portions in which the fluorescent material hardly adhered to the panel so as not to form the stripes or dots because of being exposed to reduced light. The adhesive force of the fluorescent material to the panel was represented by measuring the angle between the portion of the fluorescent material completely exposed to the light and the portion of the fluorescent material where the stripes or dots began to be detached from the panel. In this case, the measured angle was relatively indicated assuming the angle obtained with respect to the conventional surface treating material as 100.

There is shown in FIG. 1 a graph for illustrating the variation of the adhesive force according to the added amount of the silica particulates. It will be appreciated that the adhesive force of the fluorescent material to the panel is considerably increased according to the inventive surface treating process.

Namely, the adhesive force was increased for the fluorescent materials of EXAMPLES 1, 2 and 3 respectively by about 10%, 20% and 23%, and the adhesive force between the particles of the fluorescent material was also increased so as to form a dense fluorescent film.

What is claimed is:

1. A process for treating the surface of a fluorescent material to increase the adhesive force of the fluorescent material comprising the steps of adding a suitable amount of water glass ($K_2O \cdot SiO_2$) to a dispersion of a fluorescent material, the mixture of said dispersion and water glass being stirred, adding 0.3-5% by weight of silica particulates having a particle size of 0.06-0.3 $\mu m$ per the added amount of said fluorescent material to said mixture, and adding a suitable amount of metal salt to the mixture containing said silica particulates, whereby the silica particulates adhere to the surface of the fluorescent material.

2. A process according to claim 1 wherein 0.5-3% by weight of silica particulates are added.

3. A process according to claim 1 further comprising adjusting the pH to be in the range of 7 to 8.

4. A process according to claim 1 wherein said metal salt comprises a salt of one of zinc, aluminum and barium.

5. A fluorescent material produced by the process of claim 1 having an adhesive force greater than said material would have in the absence of the presence of said silica particulates.

6. A fluorescent material produced by the process of claim 2 having an adhesive force greater than said material would have in the absence of the presence of said silica particulates.

* * * * *